United States Patent [19]

Jacobson

[11] Patent Number: 4,585,019

[45] Date of Patent: Apr. 29, 1986

[54] HEAVY DUTY AIR FILTER RECONDITIONING SYSTEM

[76] Inventor: Dwight W. Jacobson, 222 Westland Park Dr., Farmington, N. Mex. 87401

[21] Appl. No.: 619,310

[22] Filed: Jun. 8, 1984

[51] Int. Cl.[4] .......................... B08B 3/02; B08B 9/00
[52] U.S. Cl. .................... 134/57 R; 134/99; 134/140; 134/144; 134/152; 134/153; 239/186; 239/565
[58] Field of Search .................... 134/52–55, 134/61, 84–86, 88, 92, 94, 95, 99, 104, 116, 140, 144, 145, 147, 148, 151–153, 157, 166 R, 167 R, 170–172, 198, 56 R, 57 R, 58 R, 162, 168 R; 118/316, 318, 321, 323; 239/565, 184, 186

[56] References Cited

U.S. PATENT DOCUMENTS

| | | | |
|---|---|---|---|
| 871,003 | 11/1907 | Teall | 239/565 X |
| 1,149,656 | 8/1915 | Likely | 134/162 |
| 2,310,771 | 2/1943 | Franz | 239/565 X |
| 2,713,001 | 7/1955 | Manning | 118/321 X |
| 2,840,037 | 6/1958 | Verba | 118/321 X |
| 3,566,892 | 3/1971 | Logue | 134/166 R X |
| 3,592,387 | 7/1971 | Pilott et al. | 239/186 |
| 3,606,897 | 9/1971 | Tobin, III et al. | 134/86 X |
| 3,620,234 | 11/1971 | Everroad | 134/86 |
| 3,650,283 | 3/1972 | Lang | 134/143 |
| 3,688,782 | 9/1972 | Smith | 134/152 X |
| 3,998,656 | 12/1976 | Grotto | 134/153 X |
| 4,041,899 | 8/1977 | Wolfe et al. | 239/186 |
| 4,090,309 | 5/1978 | Rollins | 134/153 X |
| 4,299,245 | 11/1981 | Clapper | 134/140 |

Primary Examiner—Philip R. Coe
Attorney, Agent, or Firm—Harvey B. Jacobson

[57] ABSTRACT

A spray cleaning apparatus for tubular filter elements, comprises a spray chamber in which a filter element is mounted between opposed rotary turntable discs. The chamber is provided with liquid sprays for spraying both the inner and outer surfaces of the element as it is rotated by the turntable. The sprays are reciprocated vertically so as to traverse the height of the filter element. Particular features of the invention reside in the turntable construction; a control system for accurately reversing the up-and-down movement of the sprays dependent on the height of a filter being cleaned; and a particular form of spray nozzle structure useful for cleaning pleated filter elements.

13 Claims, 8 Drawing Figures

HEAVY DUTY AIR FILTER RECONDITIONING SYSTEM

BACKGROUND OF THE INVENTION

This invention relates to apparatus for effectively cleaning and restoring tubular pleated air filter elements and the like, particularly heavy-duty automotive air filters, such that they may be reused a number of times before replacement, thereby economizing in filter costs.

STATEMENT OF PRIOR ART

The following U.S. patents pertain to washing systems for filter elements and the like, none of which, however, discloses the features of the present invention.

U.S. Pat. No. 2,871,867
U.S. Pat. No. 3,442,273
U.S. Pat. No. 3,606,897
U.S. Pat. No. 3,620,234
U.S. Pat. No. 3,624,750
U.S. Pat. No. 3,650,283
U.S. Pat. No. 3,799,178
U.S. Pat. No. 3,998,656
U.S. Pat. No. 4,299,245
U.S. Pat. No. 4,090,309

SUMMARY OF THE INVENTION

The invention provides a versatile washing and rinsing apparatus for tubular filter elements and the like, particularly heavy-duty air filters, which can be used to advantage for cleaning and/or reconditioning a variety of such elements, accommodating size and shape variations thereof, and other differentiating filter element characteristics.

Broadly stated, the invention provides spray-type washing apparatus wherein a tubular filter element or the like is positioned in vertical orientation on a turntable mechanism in a washing chamber, and spray devices are provided for directing washing and/or rinsing sprays against the inner and outer filter surfaces during rotation of the element on the turntable. Further, a drive system is provided for vertically reciprocating the spray devices so as to traverse the entire height of a filter element with the sprays.

Included among particular features of the invention are one or more of the following, namely: a turntable structure that adjusts to grip different height filter elements between upper and lower turntable elements; a control arrangement for the spray drive system which is incorporated in the adjustable turntable structure so as to provide automatic reversals in the up-and-down movement of the spray devices at points conforming to the height of a filter element being cleaned; a particular form of mounting and drive system for the spray devices; and a novel form of spray nozzle particularly adapted for spraying the exterior of pleated filter elements.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF DRAWINGS

FIG. 4 is a sectional view on line 4—4 of FIG. 2.

FIG. 6 is an end view of the nozzle.

FIG. 7 is a diagrammatic view of the spray pattern produced by the nozzle.

DESCRIPTION OF PREFERRED EMBODIMENT

Figure 1:
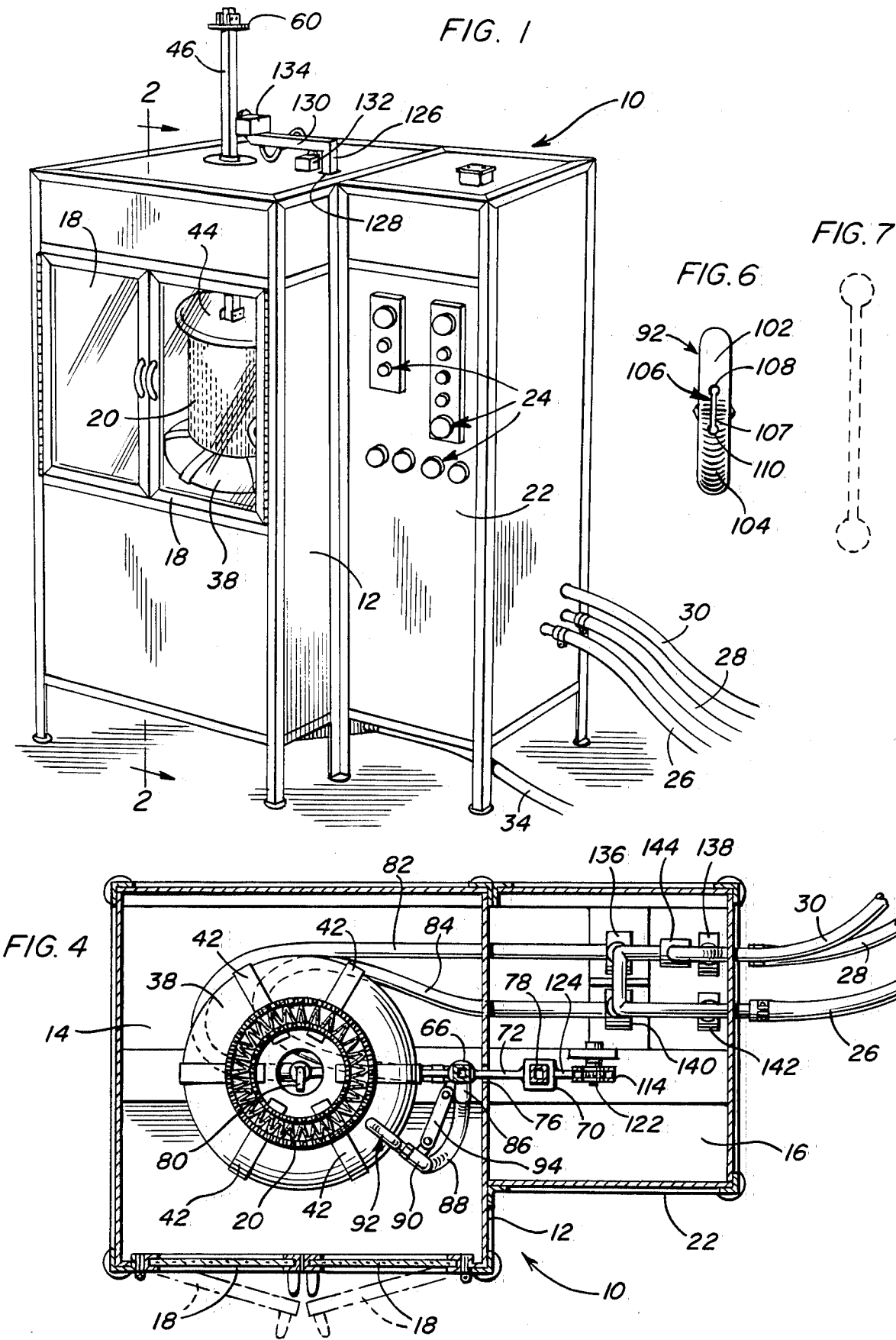
FIG. 1 is a perspective view, from the front, of a filter cleaning and reconditioning apparatus in accordance with the invention.

The illustrated filter element cleaning and reconditioning apparatus comprises a cabinet structure 10 of any suitable leak-proof construction, which is divided by a wall 12 into a washing chamber 14 and a control and drive compartment 16. Washing chamber 14 has hinged access doors 18 for positioning a filter element 20 to be cleaned therein, and for removing the filter element after cleaning. The control and drive compartment 16 has a control panel 22 provided with various controls 24 for operating the apparatus as will be described. Supply hoses 26, 28 and 30, for hot and cold water and detergent lead into compartment 16, and washing chamber 14 has a sump 32 with a drain 33 for used washing liquid, connected with an outlet hose 34.

In greater detail, located in chamber 14 is a support frame 36 for a concave base disc 38 of a turntable structure on which the filter element is supported during washing. Base disc 38 is freely rotatably mounted on the support frame with a bearing 40, and the disc has a cover of rubber strips 42 or like resilient material. Coaxially aligned above the base disc 38 is a concave, rubber covered drive disc 44 of the turntable structure connected to the bottom end of a rectangular-section suspension rod 46. Rod 46 extends through a rotary sleeve 48 of corresponding internal cross section which may be rotatably supported and suspended from the roof 50 of the apparatus, for example in a bearing assembly 52. Rod 46 can slide up and down in sleeve 48 and may be provided with a depressible sprung button 54, or the like, for holding the rod in elevated position when the button is raised above the sleeve 48. The rod can be released by depressing the button to allow drive disc 44 to be lowered against the top of filter element 20 on the base disc, the free sliding arrangement of rod 46 allowing filter elements of different height to be accommodated between the discs. A rotary drive is imparted to the filter element by a variable speed electric motor 56 suspended from roof 50, which rotates sleeve 48, for example by means of a belt and pulley drive 58. The rubber covering of the base and drive discs, combined with the weight of the drive disc and rod 46 resting on the filter element provides sufficient traction for rotating the element, and the concave nature of the discs facilitates centering of the filter element therebetween. The upper end of rod 46 extends above roof 50 of the cabinet and has a control disc 60 at its upper end, for a purpose yet to be described.

As more fully described below, the apparatus is provided with a spray nozzle assembly for spraying both the inner surface and the outer pleated surface of a filter element as it rotates on the turntable structure, and a drive mechanism and control system for vertically reciprocating the spray nozzle structure so as to traverse the entire height of the filter element with sprayed liquid.

Figure 2:
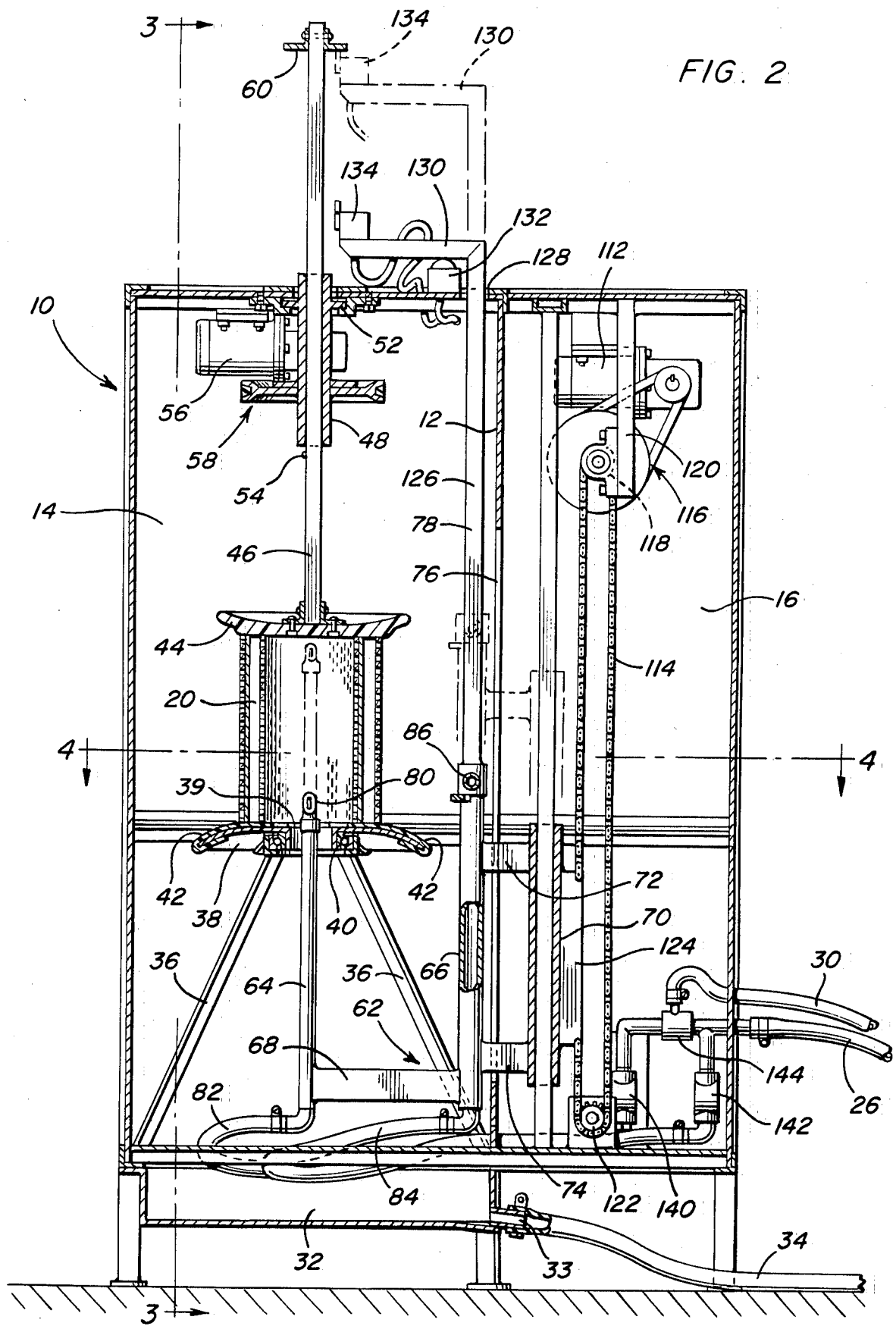
FIG. 2 is an enlarged sectional view on line 2—2 of FIG. 1.
Figure 3:
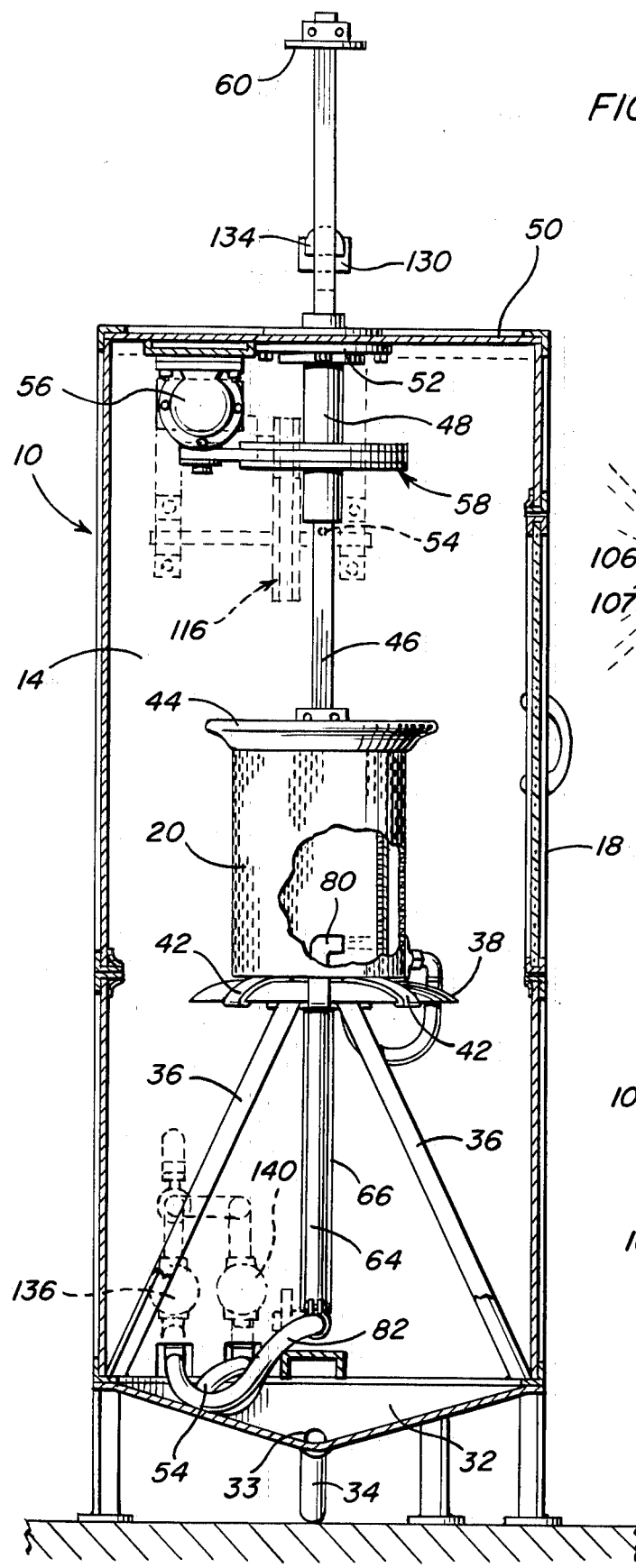
FIG. 3 is a sectional view on line 3—3 of FIG. 2.

The spray nozzle structure is generally indicated by reference 62 (FIG. 2) and comprises an inner vertical spray pipe 64 and a outer vertical spray pipe 66 interconnected by a horizontal brace 68. The outer pipe is connected to a vertical sleeve 70 by braces 72, 74 extending through a slot 76 in wall 12, sleeve 70 being guided for vertical movement on a vertical rod 78 or the like located in compartment 16. Spray pipe 64 extends upwardly through a central opening 39 in base disc 38, and is provided at its upper end with a replaceable horizontally disposed spray nozzle tube 80 terminating in a spray nozzle at its outer end of any suitable form. The length of nozzle tube 80 is selected to suit the interior diameter of filter element 20 and is preferably such as to position the spray nozzle about one inch to three inches from the inside surface of the filter element. The lower end of pipe 64 is connected to a flexible hose 82 for supply of liquid thereto as will be described.

Outer spray pipe 66 is similarly connected at its lower end to a flexible hose 84 for supply of liquid thereto as will be described, and at its upper end has an elbow fitting 86 connected through a length 88 of flexible hose to a further elbow fitting 90 and a specialized nozzle member 92. The nozzle member and elbow fitting 90 are supported from pipe 66 by a swivel arm 94 which allows the horizontal position of the nozzle to be adjusted to suit filter elements of different outside diameter.

Figure 5:
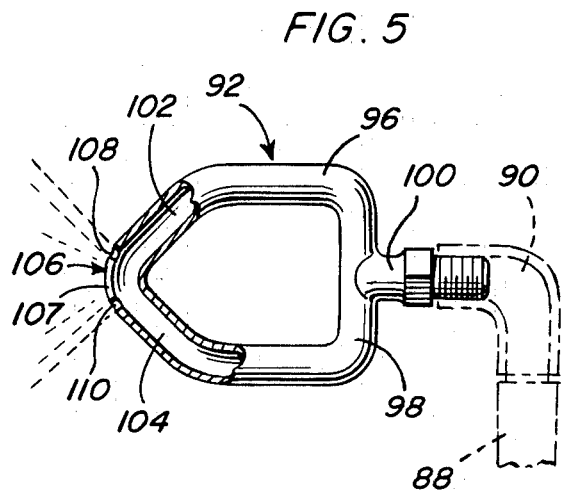
FIG. 5 is an enlarged elevational view, partly in section, of a spray nozzle used in the apparatus.
Figure 8:
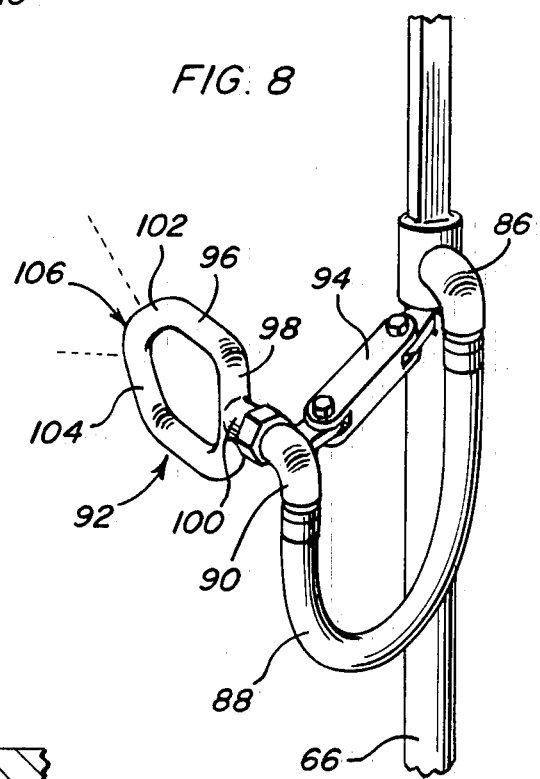
FIG. 8 is a perspective view of part of a spray device incorporating the nozzle shown in FIGS. 5 and 6.

Nozzle member 92, as shown more particularly in FIGS. 5, 6 and 8, comprises a closed pipe loop 96 with a vertical limb 98 provided with a liquid inlet 100, and converging limbs 102, 104 provided at their apex with a nozzle outlet 106. The nozzle outlet is vertically elongated and has a narrow elongate central section 107 and bulbous end sections 108, 110. The nozzle structure effectively splits incoming liquid into separate streams, which converge toward the outlet. The converging streams combined with the shape of the nozzle outlet produces a liquid spray pattern, diagrammatically indicated in FIG. 7, wherein the spray is concentrated at opposite ends of the pattern. This is particularly useful for cleaning outer pleated filter element surfaces, and for penetrating the filter end caps. As with the inner nozzle, the outer nozzle outlet may conveniently be located between about one inch to three inches from the surface of the filter element, by suitable adjustment of the swivel arm 94.

The spray nozzle structure is reciprocated vertically on rod 78 by a drive system including a reversible electric motor 112 suspended from the roof of the cabinet and driving an endless chain 114 through a suitable belt and pulley drive 116. Chain 114 is wound around an upper sprocket 118, suitably suspended from the cabinet roof on a bar 120, and a lower sprocket 122. Sleeve 70 of the spray nozzle structure is connected to chain 114 by a plate 124, so as to be moved up rod 78 when the chain is moved in one direction and down the rod when the chain is reversed, in order to cause the spray nozzles to traverse the height of the filter element.

A specialized control system is provided to effect reversals of motor 112 at the proper time for the spray nozzles effectively to traverse the correct height of the filter element. Thus, the control system includes an elongate bar 126 extending vertically from the top of spray pipe 66 through an opening 128 in roof 50, and having a horizontal section 130 above the roof. A first limit switch 132 for controlling motor 12 is provided on top of roof 50 in position to be contacted by extension 130 when the spray nozzle structure descends, and a second limit switch 134 is provided on top of extension 130 in position to contact control disc 60 on top of rod 46 when the spray nozzle structure ascends. Limit switch 132 controls reversal of motor 112 at the bottom of the spray nozzle stroke, and is fixed in position vertically so that stroke reversal takes place when the nozzles are substantially at the level of turntable base disc 38, since this level is determinative of the base of a filter element being cleaned. Limit switch 134, on the other hand, controls reversal of motor 112 at the top of the spray nozzle stroke, and since the level of operation of this limit switch is vertically movable along with drive disc 44 (because switch actuator disc 60 is located on the top of rod 46), it necessarily sets the correct height for the upper end stroke reversal of the spray nozzles as determined by the vertical positioning of disc 44 on the top of the filter element. In this manner, upper-end stroke reversal of the spray nozzle assembly is automatically adapted to the particular height of a filter element being cleaned.

Liquid supply to the respective hoses 82, 84 of the inner and outer spray pipes 64 and 66 from liquid supply hoses 26, 28 and 30, is controlled through respective solenoid valves 136, 138 for hose 82 and solenoid valves 140, 142 for hose 84. Valves 136, 140 control supply of hot water to the respective hoses, while valves 138, 142 control the supply of cold water for rinsing. Further, liquid detergent may selectively be added to the hot water supply through a detergent control valve 144. All of the valves may be suitably operated from the control panel.

The apparatus lends itself to automatic programmed operation, effecting a wash-and rinse cycle, by suitable electrical control means. The control panel may have controls for regulating the following functions, for example, namely: an on-off control for the turntable drive motor; a speed control for the turntable drive motor; an on-off control for the spray structure drive motor; a speed control for the spray structure drive motor; on-off controls for the liquid and detergent supply valves.

It will be appreciated from the foregoing that the invention provides an effective and versatile apparatus for spray-cleaning and reconditioning tubular filter elements in a variety of sizes. Moreover, the apparatus has the facility for varying the duration of respective wash-and-rinse cycles, as well as the speed of rotation of the filter element and of the spray traverse.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. Apparatus for the spray cleaning of tubular filter elements and the like, comprising cabinet means defining a spraying chamber, support means in the chamber for a rotatable lower turntable disc, suspension means in the chamber for a vertically adjustable rotatable upper turntable disc, the upper and lower discs being adapted to grip a vertically oriented tubular filter element therebetween for rotation of the element by positioning the element on the lower disc and vertically adjusting the upper disc to engage the top of the element, drive means for rotating at least one of the discs to provide rotation of the filter element, and spray means in the chamber for cleaning at least one of the inner and outer surfaces of the filter element as it rotates, the apparatus including means associated with the cabinet means mounting the spray means for vertical reciprocation in the chamber to traverse the height of the filter element, second drive means for providing vertical reciprocation of the spray means, and control means for providing reversal of the spray means at levels corresponding to the height of a filter element being cleaned, wherein the control means comprises a lower level control mechanism having a fixed height related to the height of the lower turntable disc, and an upper level control mechanism operatively associated with the upper turntable disc for being positioned by the upper turntable disc at a height dependent on the height to which the upper turntable disc is adjusted.

2. The invention of claim 1 wherein the upper turntable disc is secured to the bottom of a first upwardly extending rod supported by the suspension means for vertical movement, the spray means carries a second upwardly extending rod, and the upper level control mechanism includes drive-reversing switch means having cooperable elements fixed to the respective rods.

3. The invention of claim 2 wherein the lower level control mechanism includes further drive-reversing switch means having cooperable elements fixed respectively to the second rod and to a stationary part of the cabinet means.

4. The invention of claim 1 wherein the upper turntable disc is secured to the bottom of a non-circular section rod extending upwardly for vertical sliding adjustment through a sleeve of corresponding section supported in a roof portion of the cabinet means to provide a part of the suspension means, wherein the rod includes a spring detent member for releasably retaining the rod in elevated position when the detent member is moved upwardly through the sleeve, and wherein the drive means includes motor means for rotating the sleeve.

5. The invention of claim 4 wherein the turntable discs are of concave shape to facilitate centering of a filter element therebetween.

6. The invention of claim 5 wherein the discs comprise or are covered in friction material.

7. Apparatus for the spray cleaning of tubular filter elements and the like, comprising cabinet means defining a spraying chamber, support means in the chamber for a rotatable lower turntable disc, suspension means in the chamber for a vertically adjustable rotatable upper turntable disc, the upper and lower discs being adapted to grip a vertically oriented tubular filter element therebetween for rotation of the element by positioning the element on the lower disc and vertically adjusting the upper disc to engage the top of the element, drive means for rotating at least one of the discs to provide rotation of the filter element, and spray means in the chamber for cleaning at least one of the inner and outer surfaces of the filter element as it rotates, wherein the spray means comprises a spray structure including an inner spray device for cleaning an inner surface of a filter element received between the turntable discs, and an outer spray device for cleaning an outer surface of the element, the inner spray device including a vertical liquid pipe extending through a central opening in one of the turntable discs and terminating in an inner spray nozzle, the outer spray device including a further vertical liquid pipe disposed outwardly of the turntable discs and terminating in an outer spray nozzle, the respective spray devices being interconnected and mounted on vertical slide means for up-and-down movement to traverse the height of a filter element, the apparatus including second drive means for effecting vertical reciprocation of the spray structure, and wherein the outer spray nozzle comprises a vertically disposed tubing loop having a centrally disposed inlet on one side of the loop, and converging portions on the other side of the loop leading to an elongate vertically disposed spray outlet at the apex of the converging portions.

8. The invention of claim 7 wherein the second drive means includes a reversible drive motor and a vertically disposed endless element driven by the motor, with the spray structure connected to the endless element.

9. The invention of claim 8 including control means for providing reversals of the drive motor at levels related to the levels of the respective upper and lower turntable discs.

10. The invention of claim 9 wherein the control means comprises respective upper and lower control mechanisms, the lower level control mechanism being fixed at a height related to the height of the lower turntable disc, and the upper level control mechanism being operatively connected with the upper turntable disc whereby the height of operation of the upper level control mechanism is automatically adjusted in conformance with the height to which the upper turntable disc is adjusted.

11. The invention of claim 7 wherein the inner and outer liquid pipes are provided with respective flexible liquid supply hoses accommodating the up-and-down movement of the pipes, and the hoses are connected to liquid inlet fittings controlled by solenoid-operated valves.

12. The invention of claim 11 wherein the inlet fittings include fittings for selectively supplying the respective pipes with washing liquid, such as hot water mixed with detergent, and rinsing liquid, such as cold water.

13. The invention of claim 7 wherein the spray outlet has bulbous end portions.

* * * * *